United States Patent [19]

Delcorio et al.

[11] 4,226,625
[45] Oct. 7, 1980

[54] INSULATING TUNDISH VENEER COMPOSITION USEFUL IN CASTING STEEL

[75] Inventors: Guy A. Delcorio, Chicago, Ill.; Joseph V. Grothaus, Leeds, Ala.

[73] Assignee: Nalco Chemical Company, Oak Brook, Ill.

[21] Appl. No.: 45,531

[22] Filed: Jun. 4, 1979

[51] Int. Cl.³ .............................................. C04B 35/68
[52] U.S. Cl. ............................. 106/38.22; 106/38.28
[58] Field of Search ......................... 106/38.22, 38.28

[56] References Cited

U.S. PATENT DOCUMENTS

| | | | |
|---|---|---|---|
| 3,184,813 | 5/1965 | O'Shea | 106/38.22 |
| 3,243,397 | 3/1966 | Herkimer et al. | 106/38.22 |
| 3,962,492 | 6/1976 | Phelps | 106/38.22 |
| 4,014,704 | 3/1977 | Miller | 106/38.22 |

Primary Examiner—Maurice J. Welsh
Attorney, Agent, or Firm—John G. Premo; Robert A. Miller; John S. Roberts, Jr.

[57] ABSTRACT

A composition for insulating or coating tundish materials useful in casting steel which comprises two forms:

| | Broad (%) | Medium (%) | Preferred (%) |
|---|---|---|---|
| (a) a troweling mix | | | |
| Celite 300 (diatomaceous earth) | 5–50 | 5–25 | 10.0 |
| 200M Mullite (refractory silica-alumina filler) | 5–50 | 10–30 | 27.0 |
| M&D clay (refractory filler) | 2–20 | 2–15 | 7.5 |
| Goulac (wood glue) | 0.2–5 | 0.2–2.5 | 0.5 |
| Cerafiber 312 (silica-alumina fiber) | 5–25 | 5–15 | 7.5 |
| 3216 Graphite (graphite) | 1–25 | 5–20 | 10.0 |
| Nalgun #2 Binder (colloidal silica binder) | 1–30 | 5–15 | 7.5 |
| Water | 15–50 | 20–40 | 30.0 |
| (b) a gunning mix | | | |
| Celite 300 (diatomaceous earth) | 5–50 | 5–25 | 15.0 |
| 200M Mullite (refractory silica-alumina filler) | 5–50 | 10–30 | 36.8 |
| M&D clay (refractory filler) | 2–20 | 5–15 | 10.0 |
| Goulac (wood glue) | 0.5–5 | 0.5–2.5 | 0.7 |
| Cerafiber 312 (silica alumina fiber) | 5–25 | 5–15 | 10.0 |
| 3216 Graphite (graphite) | 1–25 | 5–20 | 15.0 |
| Nalgun #2 Binder (colloidal silica binder) | 1–30 | 5–15 | 10.0 |
| Water | 1–10 | 1–5 | 2.5 |

7 Claims, 1 Drawing Figure

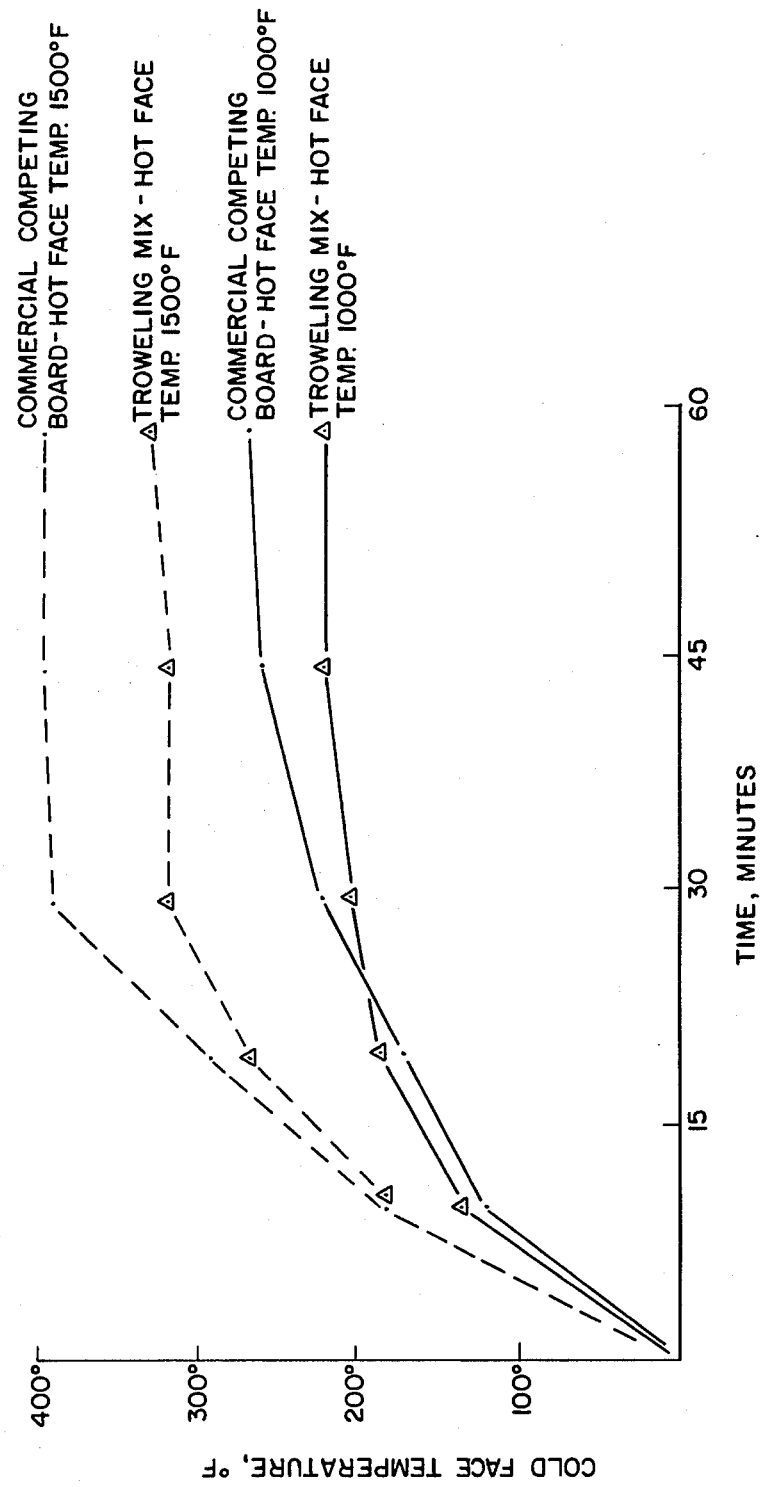

INSULATING TUNDISH VENEER COMPOSITION USEFUL IN CASTING STEEL

The present invention is designed to provide an insulating composition or compositions for use in casting steel where one of the receptacles is called a tundish. A discussion of tundishes is set out in *The Making, Shaping and Treating of Steel,* 9th edition, 1971, U.S. Steel, page 710, FIG. 23, etc. Also see Millot, "Clay," *Scientific American,* April, 1979, pages 109–118.

In one form of this invention the tundish coating or tundish board which is utilized contains about 30% water in a troweling mix and a second form is the "nonaqueous" gunning mix which is used cold or at room temperature. The formulation of the recipe herein described is one of simplicity in that each composition or mixture is stirred from 10–15 minutes in a suitable container.

STATEMENT OF PRIOR ART

The prior art in which this invention falls is shown by U.S. Pat. No. 4,014,704 Miller (Johns-Manville) which describes the difficulties of insulating where, as here, molten steel and molten metal are contacted.

THE INVENTION

This invention relates to a composition for insulating or coating tundish materials useful in casting steel which comprises two forms:

|  | Broad (%) | Medium (%) | Preferred (%) |
| --- | --- | --- | --- |
| (a) a troweling mix |  |  |  |
| Celite 300 (diatomaceous earth) | 5–50 | 5–25 | 10.0 |
| 200M Mullite (refractory silica-alumina filler) | 5–50 | 10–30 | 27.0 |
| M&D clay (refractory filler) | 2–20 | 2–15 | 7.5 |
| Goulac (wood glue) | 0.2–5 | 0.2–2.5 | 0.5 |
| Cerafiber 312 (silica-alumina fiber) | 5–25 | 5–15 | 7.5 |
| 3216 Graphite (graphite) | 1–25 | 5–20 | 10.0 |
| Nalgun #2 Binder (colloidal silica binder) | 1–30 | 5–15 | 7.5 |
| Water | 15–50 | 20–40 | 30.0 |
| (b) a gunning mix |  |  |  |
| Celite 300 (diatomaceous earth) | 5–50 | 5–25 | 15.0 |
| 200M Mullite (refractory silica-alumina filler) | 5–50 | 10–30 | 36.8 |
| M&D clay (refractory filler) | 2–20 | 5–15 | 10.0 |
| Goulac (wood glue) | 0.5–5 | 0.5–2.5 | 0.7 |
| Cerafiber 312 (silica alumina fiber) | 5–25 | 5–15 | 10.0 |
| 3216 Graphite (graphite) | 1–25 | 5–20 | 15.0 |
| Nalgun #2 Binder (colloidal silica binder) | 1–30 | 5–15 | 10.0 |
| Water | 1–10 | 1–5 | 2.5 |

Both the troweling mix containing additional water and the gunning mix for utilization in a hand applicator have the unique advantage of insulating properties and the utilization of graphite. Both methods of applying are different from the conventional tundish board which has to be set in place when the tundish is cold and after one use must be discarded. Also, the gunning material can be utilized when the tundish is hot and the surface is restored to its original contour with enough insulating material. The gunning variety is more versatile in that, as above, it can be applied to the tundish in the stand when it is hot, which takes about 15–20 minutes, whereas previous procedures necessitated pulling the tundish out, letting it cool, relining it and putting it back up, which takes about 24 hours.

BRIEF DESCRIPTION OF THE COMPOSITION OF THE INSTANT INVENTION

The basic composition of most formulations of the instant invention although other ingredients can be utilized basically comprises:

(A) A refractory filler
(B) Clay
(C) Wood glue
(D) A colloidal silica binder
(E) Wetting agent
(F) A refractory fiber
(G) Graphite
(H) Water (A) The refractory filler utilized may include any number of well-known refractory grain materials. These refractory fillers are generally stable forms of aluminum-silicates and may either be synthetic or naturally occurring. A preferred form of refractory filler is mullite.

(B) The clay utilized in this invention may be any number of hydrated aluminum-silicates or mixtures thereof. Preferred forms of clay include those categorized as ball clays which while being hydrated aluminum-silicates have good plasticity, strong bonding power and high refractoriness. Clays of this type which may be utilized include kaolinite, montmorillonite and bentonite.

(C) The wood glues employed in this invention are generally either natural or modified materials obtained from the sap of trees. These materials are generally thermoplastic resin emulsions which act as a glue.

(D) The colloidal silica binders useful in this invention are generally aqueous silica sol materials available commercially from the Nalco Chemical Company under the trademark Nalcoag or from E. I. DuPont de Neumours and can be under the trademark Ludox. Example of silica sols which are useful in this invention are found in U.S. Pat. No. 3,184,813 which is hereinafter incorporated by reference. The sol utilized in this invention was an aqueous material containing approximately 37.5 weight percent of $SiO_2$.

(E) The wetting agent employed may be either cationic, non-ionic or anionic. Preferred materials utilized in this invention are anionic water soluble materials. Due to the variety of materials employed, it is impossible to list all materials which will perform in this invention. A preferred material, however, is Aerosol OT available from the American Cyanimid Company which is described as the dioctyl ester of sodium sulfosuccinic acid. It should be pointed out, however, that other wetting agents would also be expected to perform satisfactorily in this invention.

(F) The alumina-silica refractory fibers utilized are conventional alumina-silica refractory fibers. An example of a material of this type is Fiberfrax available commercially from the Carborundum Company. Of course, other materials may be utilized with the instant invention. These materials include thickening agents such as acrylamide-acrylic acid copolymers, biocides to prevent deterioration of the material during storage and the like.

(G) The graphite selected for use in our invention may be in any of the commercially available forms, including both an amorphous and crystalline materials. It is only important that the material be capable of being suspended in aqueous solutions and thus the particle size should not be so large as to prevent this from occurring. We have found it particularly expedient and commercially advantageous to use amorphous graphite due to its lower cost and the absence of the need for extremely high purity material.

NON-AQUEOUS PROPERTIES

The present invention provides a tundish board or gunning mix which is insulating or in which the thermal conductivity is low. Experiments with comparative tundish boards have shown that the insulating comparison favors the present invention.

DESCRIPTION OF THE DRAWING

In the FIGURE it is noted that a board formulated according to the preferred formula for the troweling mix provided less heat transfer than a commercial competing board shown in the FIGURE.

A test to determine the heat transfer of the troweling mix compared to a competing tundish board was conducted by inserting a 1¼" thick section of test material into a muffle furnace at 1000° F. and 1500° F. The muffle furnace was allowed to soak at temperature for one hour, inserting the test specimen (5.35"×4.50"×1.25") into the furnace door. The hot face temperature was measured using a thermal couple contacting the cold face of the test specimen. The cold face temperature was recorded over a one-hour period to determine the relative thermal conductivity between the two test specimens.

EXAMPLE

A non-aqueous tundish composition was formulated from the percentiles of the following ingredients by thorough mixing in a 25.5 liter container for 15 minutes:

|  | Percent |
| --- | --- |
| Mullite | 45.29 |
| Clay | 6.66 |
| Wood glue | 0.53 |
| Colloidal silica binder | 10.66 |
| Water | 10.12 |
| Water soluble acrylamide-acrylic acid copolymer (thickener) | 0.02 |
| Wetting agent | 0.06 |
| Alumina-silica fiber | 26.64 |

The above was utilized as a tundish lining composition in casting steel and exhibited superior insulating properties as well as being quickly useful in patching and repairing existing tundish board.

We claim:

1. A tundish composition useful in casting steel which has the range of components as a troweling mix as follows:

|  | Percent |
| --- | --- |
| Diatomaceous earth | 5–50 |
| Refractory silica-alumina filler | 5–50 |
| Clay | 2–20 |
| Wood glue | 0.2–5 |
| Silica-alumina fiber | 5–25 |
| Graphite | 1–25 |
| Colloidal silica binder | 1–30 |
| Water | 15–50 |

2. The tundish composition according to claim 1 wherein the range of components as a troweling mix is as follows:

|  | Percent |
| --- | --- |
| Diatomaceous earth | 5–25 |
| Refractory silica-alumina filler | 10–30 |
| Clay | 2–15 |
| Wood glue | 0.2–2.5 |
| Silica-alumina fiber | 5–15 |
| Graphite | 5–20 |
| Colloidal silica binder | 5–15 |
| Water | 20–40 |

3. The tundish composition according to claim 1 wherein the percentages are as follows:

|  | Percent |
| --- | --- |
| Diatomaceous earth | 10.0 |
| Refractory silica-alumina filler | 27.0 |
| Clay | 7.5 |
| Wood glue | 0.5 |
| Silica-alumina fiber | 7.5 |
| Graphite | 10.0 |
| Colloidal silica binder | 7.5 |
| Water | 30.0 |

4. A tundish composition useful in casting steel which has the range of components as a gunning mix as follows:

|  | Percent |
| --- | --- |
| Diatomaceous earth | 5–50 |
| Refractory silica-alumina filler | 5–50 |
| Clay | 2–20 |
| Wood glue | 0.5–5 |
| Silica alumina fiber | 5–25 |
| Graphite | 1–25 |
| Colloidal silica binder | 1–30 |
| Water | 1–10 |

5. The tundish composition according to claim 4 wherein the range of components as a gunning mix is as follows:

|  | Percent |
| --- | --- |
| Diatomaceous earth | 5–25 |
| Refractory silica-alumina filler | 10–30 |
| Clay | 5–15 |
| Wood glue | 0.5–2.5 |
| Silica alumina fiber | 5–15 |
| Graphite | 5–20 |
| Colloidal silica binder | 5–15 |
| Water | 1–5 |

6. The tundish composition according to claim 4 wherein the percentages are as follows:

|  | Percent |
| --- | --- |
| Diatomaceous earth | 15.0 |
| Refractory silica-alumina filler | 36.8 |
| Clay | 10.0 |
| Wood glue | 0.7 |
| Silica alumina fiber | 10.0 |
| Graphite | 15.0 |
| Colloidal silica binder | 10.0 |
| Water | 2.5 |

7. A tundish composition useful in casting steel which has the following components

|  | Percent |
| --- | --- |
| Mullite | 45.29 |
| Clay | 6.66 |
| Wood glue | 0.53 |
| Colloidal silica binder | 10.66 |
| Water | 10.12 |
| Acrylamide-acrylic acid copolymer | 0.02 |
| Wetting agent | 0.06 |
| Alumina-silica fiber | 26.64 |

* * * * *